(12) United States Patent
Shulman

(10) Patent No.: US 7,680,078 B2
(45) Date of Patent: Mar. 16, 2010

(54) SYSTEM, APPARATUS AND METHOD OF SCHEDULING TRANSMISSIONS

(75) Inventor: Nadav Shulman, Raanana (IL)

(73) Assignee: Intel Corporation, Santa Clara, CA (US)

( * ) Notice: Subject to any disclaimer, the term of this patent is extended or adjusted under 35 U.S.C. 154(b) by 410 days.

(21) Appl. No.: 11/318,497

(22) Filed: Dec. 28, 2005

(65) Prior Publication Data

US 2007/0147288 A1   Jun. 28, 2007

(51) Int. Cl.
*H04Q 7/00* (2006.01)
(52) U.S. Cl. .................. 370/329; 370/332; 370/333; 370/334; 370/341; 370/348
(58) Field of Classification Search ....... 455/435.2–453
See application file for complete search history.

(56) References Cited

U.S. PATENT DOCUMENTS

| | | | | |
|---|---|---|---|---|
| 6,347,234 B1* | 2/2002 | Scherzer | ................ | 455/562.1 |
| 7,463,616 B1* | 12/2008 | Earnshaw et al. | ........... | 370/347 |
| 2002/0183066 A1* | 12/2002 | Pankaj | ....................... | 455/453 |
| 2004/0136343 A1* | 7/2004 | Lee et al. | ..................... | 370/335 |
| 2004/0203857 A1* | 10/2004 | Wang | ...................... | 455/456.1 |
| 2005/0152303 A1* | 7/2005 | Li et al. | ...................... | 370/328 |
| 2005/0250540 A1* | 11/2005 | Ishii et al. | .................. | 455/561 |
| 2007/0049211 A1* | 3/2007 | Rensburg et al. | .............. | 455/69 |

\* cited by examiner

*Primary Examiner*—Patrick N Edouard
*Assistant Examiner*—Dai A Phuong
(74) *Attorney, Agent, or Firm*—Pearl Cohen Zedek Latzer, LLP

(57) ABSTRACT

Briefly, a wireless system, a base station and a method of scheduling data transmissions by allocating resources to a mobile station based on at least an estimated obsoleteness rate of a channel knowledge of the mobile station.

17 Claims, 3 Drawing Sheets

SYSTEM, APPARATUS AND METHOD OF SCHEDULING TRANSMISSIONS

BACKGROUND OF THE INVENTION

A broadband wireless communication network to be used in a metropolitan area may use an access scheme based on the IEEE 802.16e Standard also known in the art as WiMAX. In such a broadband wireless communication network, the medium access scheme may employ an Orthogonal Frequency Division Multiplexing (OFDM) system and/or a Time Division Multiple Access (TDMA) systems.

The broadband wireless communication network may include at least one base station and a plurality of mobile stations. The base station may be responsible for scheduling data transmissions to the plurality of mobile stations and scheduling uplink transmissions from the mobile stations. The scheduling algorithm may assign wireless broadband network resources to different mobile stations of the network. In conjunction with the assignment of a resource to a mobile station, modulation and coding rates which may be used over the assigned resource may be determined.

In some wireless networks that employ TDMA the resources may be discriminated by time of transmission. In some other wireless networks that employ OFDM and/or Frequency Division Multiple Access (FDMA) and/or TDMA the resources may be discriminated by both time and frequency.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
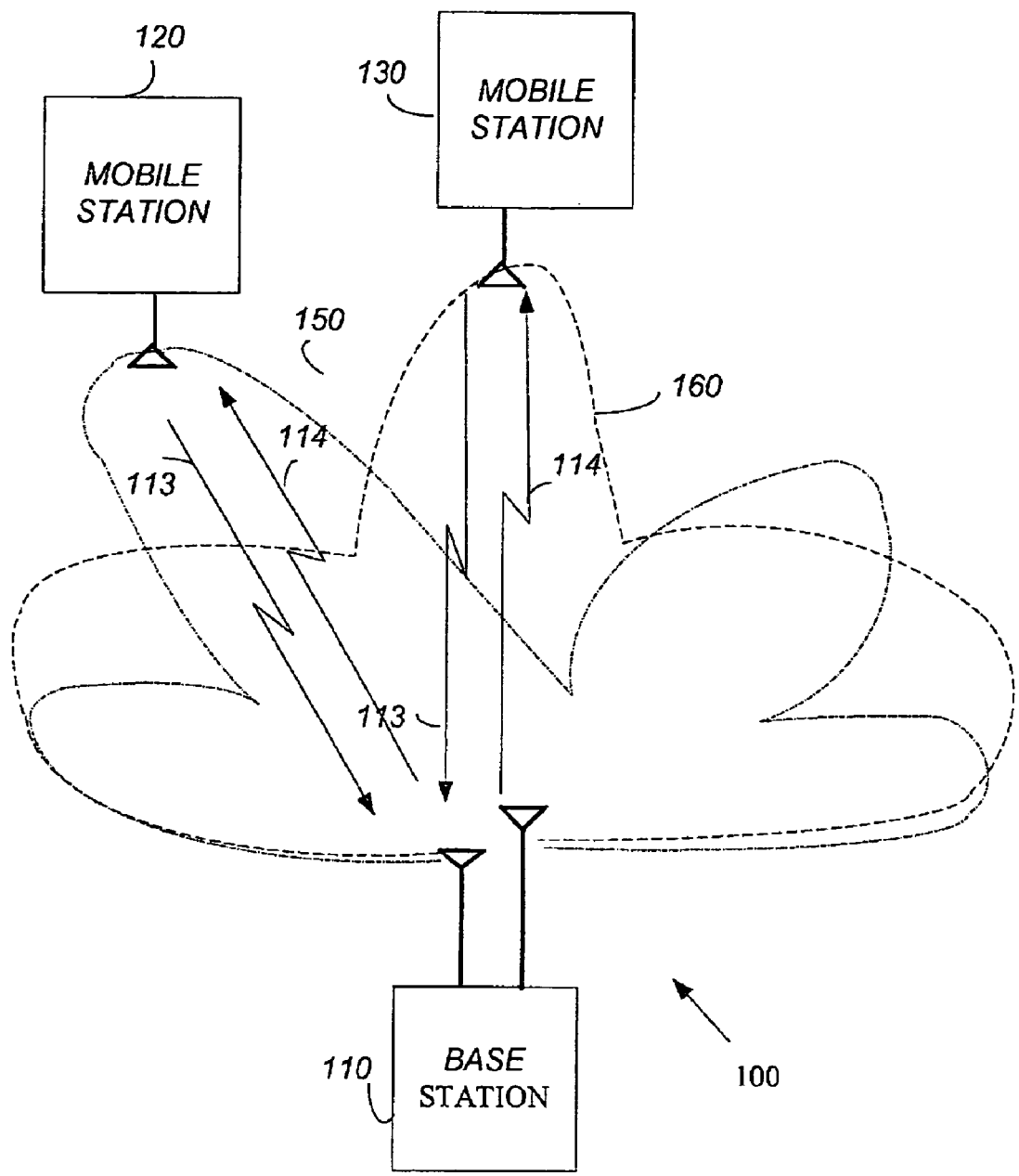
FIG. 1 is a schematic block diagram of a wireless communication system according to an exemplary embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

It should be understood that the present invention may be used in a variety of applications. Although the present invention is not limited in this respect, the circuits and techniques disclosed herein may be used in many apparatuses such as, for examples modems, wireless local area network (WLAN) stations, wireless metropolitan area network (WMAN) stations or the like. Portable communication devices intended to be included within the scope of the present invention may include, by a way of example only, cellular radiotelephone portable communication devices, digital communication system portable devices, and the like.

For simplicity, although the scope of the invention is in no way limited in this respect, embodiments of the present that will be described below may be related to a WMAN. The term "plurality" may be used throughout the specification to describe two or more components, devices, elements, parameters and the like. For example, "plurality of mobile stations" describes two or more mobile stations. In addition, it should be known to one skilled in the art that the term "a portable communication device" may refer to, but is not limited to, a mobile station, a portable radiotelephone device, a cellphone, a cellular device, personal computer, Personal Digital Assistant (PDA), user equipment and the like.

Furthermore, the term "channel" is a general term to describe communication channels of a wireless communication system such as, for example a downlink channel, an uplink channel, a data channel, a control channel or the like. For simplicity and the clarity of the description uplink and downlink channels may be used to describe the channel according to embodiments of the present invention.

Some embodiments of the invention may be implemented, for example, using a machine-readable medium or article which may store an instruction or a set of instructions that, if executed by a machine (for example, by a wireless station, and/or by other suitable machines), cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, high level design programming language, assembly language, machine code, or the like.

Referring firstly to FIG. 1, a block diagram of a wireless communication system 100 according to some embodiments of the present invention is shown. Wireless communication system 100 may include a base station 110 and mobile stations 120 and 130.

According to exemplary embodiment of the invention, base station 110 may use one or more different beam forming schemes to transmit signals to mobile stations 120 and 130. For example, a first beam forming scheme may form a beam 150 (shown with a line dot line) and a second beam forming scheme may form a beam 160 (shown with a dotted line). The different beams may have different lobe patterns.

Although the scope of the present invention is not limited in this respect, base station 110 may transmit over a downlink channel 114 modulated radio frequency (RF) signals to mobile stations 120 and 130, and may receive over an uplink channel modulated RF signals from mobile stations 120 and 130. It should be understood that a quality of a channel (e.g., downlink channel 114 and/or uplink channel 113) may vary according to a behavior of the mobile station (e.g., mobile station 130). For example, in order to have knowledge about the channel base station 110 may learn the channel, if desired. For example, the base station may learn the downlink channel from the uplink channel and/or receive information on the down link channel from the mobile station.

According to one embodiment of the invention, the mobile station velocity may be estimated at the base station. According to other embodiments of the invention, the mobile station velocity may be estimated at the mobile station and fed back to the base station. It should be understood that a mobile station of high velocity experiences a channel (e.g., downlink channel) of a high variation rate and thus the ability of the base station (e.g., base station 110) to learn its downlink channel 114 involves a high obsoleteness rate.

According to this exemplary embodiment of the present invention, mobile station 130 may move out of range of an antenna beam (e.g., beam 150). This may cause the knowledge of a base station about the downlink channel to become obsolete. According to embodiments of the present invention, the rate that the knowledge about a channel (e.g. downlink channel, uplink channel and/or any other channel) may become obsolete at a base station may be defined as an obsoleteness rate. The base station (e.g., base station 110) may estimate an obsoleteness rate of the channel and may allocate resources to a. target mobile station (e.g., mobile station 130) according to the obsoleteness rate, if desired.

According to this exemplary embodiment, the recourses may include one or more bean forming schemes which may be used to set an antenna lobe pattern to the direction of the targeted mobile station. Furthermore, the resources may include a time slot, a frequency band, a coding rate, a modulation scheme or the like. The base station (e.g., base station 110) may schedule transmissions to the mobile stations according to the obsoleteness rate of the channel, if desired. The obsoleteness rate of a channel may be estimated from the mobile station's knowledge of the channel and/or may be received from the one or more mobile station (e.g., mobile stations 120, 130)

According to embodiments of the present invention, base station 110 may employ a resource assigning algorithm to assign resources to the mobile stations 120 and 130. A first Mobile station (e.g., mobile station 130) may be classified as having a higher channel knowledge obsoleteness rate (e.g., downlink channel and/or uplink channel). Thus, the first mobile station may be served first and/or separately (e.g., in the time and/or in the frequency domain) from a second mobile station that is classified as having a lower obsoleteness rate. For example, "faster" mobile stations may be served using a robust beam forming scheme such as, for example, Maximum-Ratio-Combining and mobile station classified as "slow" may use another beam forming scheme such as, for example, Space Division Multiple Access (SDMA) and/or space-time codes, if desired.

Figure 2:
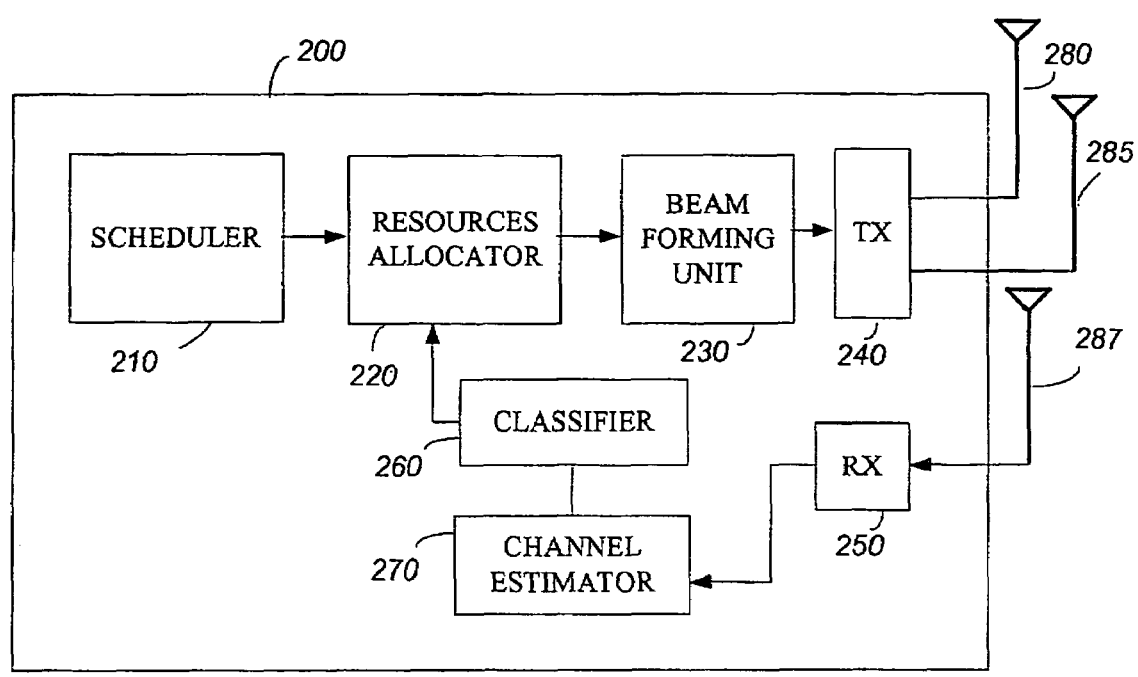
FIG. 2, is a schematic block diagram of a base station according to exemplary embodiments of the invention.

Turning to FIG. 2, a block diagram of a base station 200 according to exemplary embodiments of the invention is shown. Although the scope of the present invention is not limited in this respect, base station 200 may include a scheduler 210, a resources allocator 220, a beam forming unit 230, a transmitter (TX) 240, a receiver (RX) 250, a classifier 260 and a channel estimator 270.

According to some embodiments of the invention, base station 200 may include one or more antennas, for example, antennas 280, 285 and 287. Antennas 280, 285 and 287 may include a dipole antenna, a dual polar panel antenna, an omni antenna, a Yagi antenna and/or be part of an antenna array, although the scope of the present invention is not limited in this respect.

According to some exemplary embodiments of the present invention, base station 200 may receive over an uplink channel transmissions from one or more mobile stations. Channel estimator 270 may learn the uplink channel, and may estimate an obsoleteness rate of the downlink channel based on the uplink channel knowledge. In addition, channel estimator 270 may estimate an obsoleteness rate of the uplink channel based on the received transmissions.

Classifier 260 may classify the mobile station based on the estimated obsoleteness rate. For example, a mobile station of high velocity that experiences a channel (e.g., downlink channel) of a high variation rate may be classified as a "fast" mobile station, and a mobile station of low velocity may be classified as a "slow" mobile station, although the scope of the present invention is not limited in this respect. However, according to other embodiments of the invention, the base station may receive over the uplink channel the obsoleteness rate of the mobile station and/or the class of the mobile station.

In exemplary embodiments of the invention, scheduler 210 may schedule data transmissions to and/or from the one or more mobile stations. For example, scheduler 210 may schedule data transmission to the one or more mobile stations classified as "fast" and then schedule data transmission to the one or more mobile stations classified as "slow". Furthermore, scheduler 210 may schedule data transmissions to the one or more mobile stations based on the obsoleteness rate of a channel knowledge of a channel by the one or more mobile station. Scheduler 210 may also scheduled data transmission of the one or more mobile stations according to the obsoleteness rate of the uplink channel, if desired.

According to embodiments of the invention, resources allocator 220 may allocate resources to the one or more mobile stations based on an estimated obsoleteness rate of a channel's knowledge of the one or more mobile stations. Beam forming unit 230 may form an antenna beam (e.g., antenna beams 150 and 160) according to a desired beam forming scheme. For example, the desired beam forming scheme may be based on the classification of the mobile station. In some other embodiments of the invention the beam forming may be done according to a downlink quality of the target mobile station, if desired.

Transmitter 240 may transmit the data transmission through antennas 280, 285 which may have their beams set according to the assigned beam forming scheme. It should be understood that the -beam patterns may not necessarily be fixed according to the geometry of the antennas. In some embodiments, the beam pattern may be set by a signal provided into the antennas, although the scope of the present invention is not limited in this respect.

Figure 3:
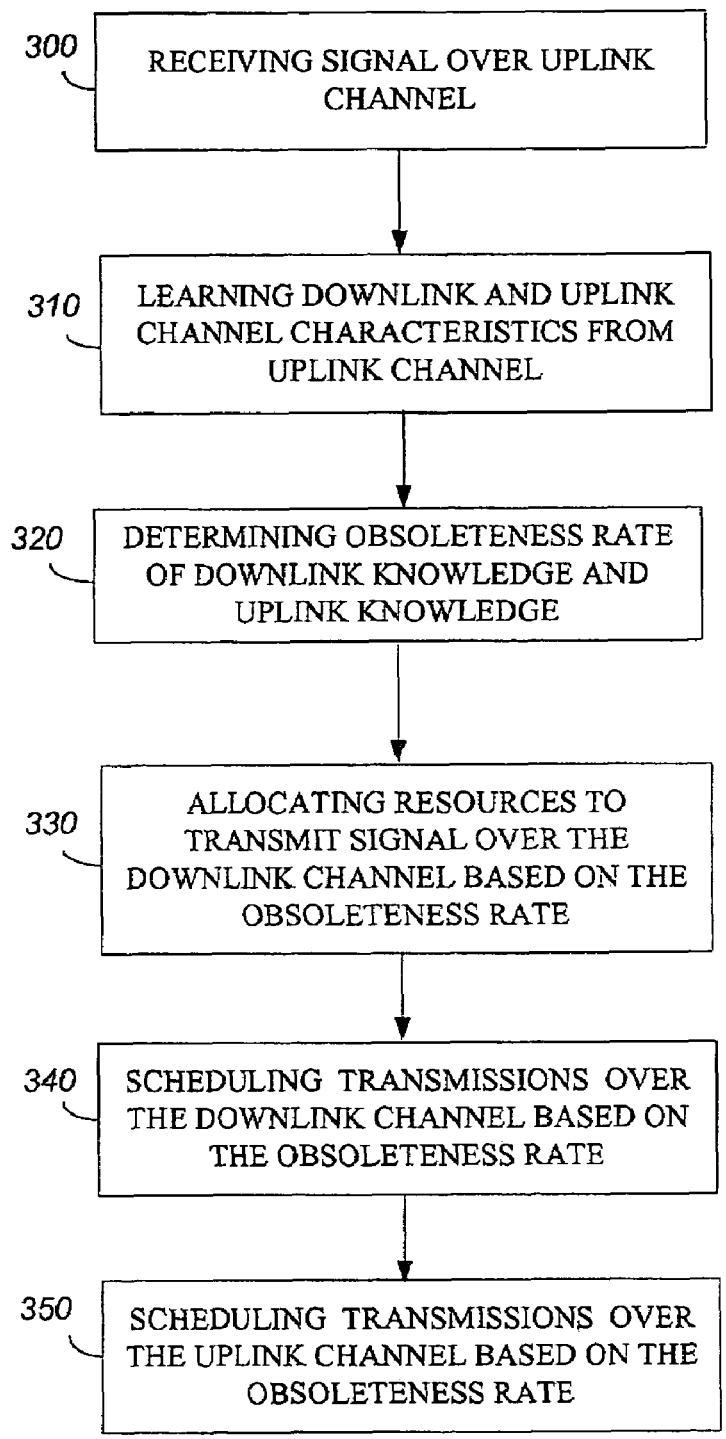
FIG. 3 is a schematic flowchart of a method of scheduling transmissions over a downlink channel according to exemplary embodiments of the invention.

Turning to FIG. 3 a flowchart of a method of scheduling transmissions over a downlink channel according to exemplary embodiments of the invention is shown. Although the scope of the present invention is not limited in this respect, according to some exemplary embodiments of the invention, base station 200 may receive a signal over an uplink channel (text block 300). Base station 200 may learn a downlink channel characteristics and/or an uplink channel characteristics based on the received signal to have at least some knowledge for example received signal strength, noise or the like on a downlink and/or uplink channels characteristics (text block 310). Base station 200 may determine an obsoleteness rate of knowledge of the downlink channel and/or the uplink channel characteristics (text block 320).

According to this exemplary embodiment, base station 200 may allocate resources to transmit signals over the downlink channel based on the obsoleteness rate, e.g. of the downlink and/or the uplink channel knowledge, and to receive signals over the uplink channel based on the obsoleteness rate, e.g. of the uplink and/or the downlink channel knowledge (text block 330). Furthermore, base station 200 may schedule transmission to a target mobile station based on the obsoleteness rate of the knowledge on the downlink channel of the target mobile station (text block 340) an may schedule transmission from the target mobile station based on the obsoleteness rate of the knowledge on the uplink channel (text box 350). For example, in order to utilize its channel knowledge as long as it is not obsolete, a mobile station classified as having a "fast" obsoleteness rate of the knowledge on the downlink channel and/or the uplink channel may be served before a mobile station having a "slow" obsoleteness rate of the knowledge on the downlink channel, although the scope of the present invention is not limited in this respect.

According to other embodiments of the present invention, a base station may include a single antenna. Thus, the base station may serve a mobile station classified as "fast" first, and a mobile station classified "slow" second in order to utilize a temporarily good channel condition to the mobile station classified as "fast", while maintaining good channel conditions to the mobile station classified as "slow" for a longer time period, although the scope of the present invention is not limited in this respect.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method of transmitting comprising: receiving over an uplink, a mobile station velocity as estimated at the mobile station; learning knowledge about a downlink channel based on a received signal over an uplink channel, the received signal indicating the mobile station velocity; estimating an obsoleteness rate of the knowledge of the downlink channel; classifying the mobile station as "fast" or "slow" based on the estimated obsoleteness rate; allocating a Maximum-Ratio-Combining beam forming scheme to a first mobile station classified as "fast"; and allocating a Space Division Multiple Access (SDMA) beam forming scheme to a second mobile station classified as "slow"; and scheduling data transmissions over the downlink channel by allocating resources to the mobile station based on the estimated obsoleteness rate of the knowledge of the downlink channel, wherein the resources include at least one of: the Maximum-Ratio-Combining beam forming scheme, the SDMA beam forming scheme, a time slot, a frequency band, a coding rate and a modulation scheme.

2. The method of claim 1, wherein allocating comprises: allocating resources based on the velocity of the mobile station.

3. The method of claim 1, wherein allocating comprises: allocating resources based on a variation rate of the uplink channel.

4. An apparatus comprising:
a channel estimator to estimate an obsoleteness rate of a downlink channel based on knowledge of an uplink channel wherein, the knowledge includes a mobile station velocity as estimated at the mobile station;
a scheduler to schedule data transmissions;
a classifier to classify the mobile station as "fast" or "slow" based on the estimated obsoleteness rate;
a beam forming unit to form an antenna lobe pattern to a direction of the mobile station according to a desired beam forming scheme based on a class of the channel quality wherein, the beam forming unit is able to allocate a Maximum-Ratio-Combining beam forming scheme to two or more antennas to transmit a first signal to a first mobile station whose channel is classified as "fast," and to allocate a Space Division Multiple Access (SDMA) beam forming scheme to the two or more antennas to transmit a second signal to a second mobile station whose channel is classified as "slow"; and
a resources allocator to allocate resources to the mobile station based on the estimated obsoleteness rate of the downlink channel knowledge, wherein the resources include at least one of: the desired beam forming scheme, a time slot, a frequency band, a coding rate and a modulation scheme.

5. The apparatus of claim 4, wherein the apparatus comprises:
a receiver to receive transmissions over the uplink channel; and
the channel estimator is to estimate the estimated obsoleteness rate of the knowledge of the downlink channel based on knowledge of the uplink channel.

6. The apparatus of claim 4, comprising a receiver able to receive the estimated obsoleteness rate of the knowledge of the downlink channel from the mobile station.

7. The apparatus of claim 4,
wherein the scheduler is able to schedule data transmissions to a first mobile station whose channel is classified as a high obsoleteness rate, first, and to schedule data transmissions to a second mobile station whose channel is classified as a low obsoleteness rate, second.

8. A base station comprising:
a channel estimator to estimate an obsoleteness rate of a downlink channel based on knowledge of an uplink channel wherein, the knowledge includes a mobile station velocity as estimated at the mobile station;
a scheduler to schedule data transmissions;
an antenna array to transmit and receive the data transmissions over one or more channels;
a classifier to classify the mobile station as "fast" or "slow" based on the estimated obsoleteness rate;
a beam forming unit to form an antenna beam according to a desired beam forming scheme based on a class of the channel quality wherein, the beam forming unit is able to allocate a Maximum-Ratio-Combining beam forming scheme to two or more antennas to transmit a first signal to a first mobile station whose channel is classified as "fast," and to allocate a Space Division Multiple Access (SDMA) beam forming scheme to the two or more antennas to transmit a second signal to a second mobile station whose channel is classified as "slow"; and
a resources allocator to allocate resources to the mobile station based on the estimated obsoleteness rate of the downlink channel knowledge, wherein the resources include at least one of the desired beam forming scheme, a time slot, a frequency band, a coding rate and a modulation scheme.

9. The base station of claim 8, comprising:
a receiver to receive transmissions over the uplink channel; and
the channel estimator to estimate the estimated obsoleteness rate of the knowledge of the downlink channel based on knowledge of the uplink channel.

10. The base station of claim 8, comprising a receiver able to receive the estimated obsoleteness rate of the knowledge of the downlink channel from the mobile station.

11. A wireless communication system comprising:
a base station having at least:
a channel estimator to estimate an obsoleteness rate of a downlink channel based on knowledge of an uplink channel wherein, the knowledge includes a mobile station velocity as estimated at the mobile station;
a scheduler to schedule data transmissions;
a classifier to classify the mobile station as "fast" or "slow" based on the estimated obsoleteness rate;
a beam forming unit to form an antenna beam according to a desired beam forming scheme based on a class of the channel Quality wherein, the beam forming unit is able to allocate a Maximum-Ratio-Combining beam forming scheme to two or more antennas to transmit a first signal to a first mobile station whose channel is classified as "fast," and to allocate a Space Division Multiple Access (SDMA) beam forming scheme to the two or more antennas to transmit a second signal to a second mobile station whose channel is classified as "slow"; and
a resources allocator to allocate resources to the mobile station based on the estimated obsoleteness rate of the downlink channel knowledge, wherein the resources include at least one of the desired beam forming scheme, a time slot, a frequency band, a coding rate and a modulation scheme.

12. The wireless communication system of claim 11, wherein the base station comprises:
a receiver to receive transmissions over the uplink channel; and
the channel estimator to estimate the estimated obsoleteness rate of the knowledge of the downlink based on knowledge of the uplink channel.

13. The wireless communication system of claim 11, wherein the base station comprises:
an antenna and wherein the scheduler is able to schedule data transmissions to a first mobile station whose channel is classified as a high obsoleteness rate, first, and to schedule data transmissions to a second mobile station whose channel is classified as a low obsoleteness rate, second.

14. An article comprising: a computer readable medium encoded with computer executable instructions that when executed result in: receiving over an uplink, a mobile station velocity as estimated at the mobile station; learning knowledge about a downlink channel based on a received signal over an uplink channel, the received signal indicating the mobile station velocity; estimating an obsoleteness rate of the knowledge of the downlink channel; classifying the mobile station as "fast" or "slow" based on the estimated obsoleteness rate; allocating a Maximum-Ratio-Combining beam forming scheme to a first mobile station classified as "fast"; and allocating a Space Division Multiple Access (SDMA) beam forming scheme to a second mobile station classified as "slow"; and scheduling data transmissions over the downlink channel by allocating resources to the mobile station based on the estimated obsoleteness rate of the knowledge of the downlink channel, wherein the resources include at least one of:
the Maximum-Ratio-Combining beam forming schemes the SDMA beam forming scheme, a time slot, a frequency band, a coding rate and a modulation scheme.

15. The article of claim 14, wherein the instruction of allocating when executed results in:
allocating resources based on the velocity of the mobile station.

16. The article of claim 14, wherein the instruction of allocating when executed results in:
allocating resources based on a variation rate of the uplink channel.

17. The article of claim 14, wherein the instructions when executed result in:
classifying the mobile station as "fast" or "slow" based on the estimated obsoleteness rate; and
allocating a beam forming scheme based on a class of the mobile station.

* * * * *